United States Patent [19]

Andrews

[11] Patent Number: 4,713,203

[45] Date of Patent: Dec. 15, 1987

[54] BAUXITE PROPPANT

[75] Inventor: William H. Andrews, Mt. Waverley, Australia

[73] Assignee: Comalco Aluminium Limited, Victoria, Australia

[21] Appl. No.: 812,984

[22] Filed: Dec. 24, 1985

[30] Foreign Application Priority Data

May 23, 1985 [AU] Australia .............................. PH0703
Jul. 1, 1985 [AU] Australia .............................. PH1268

[51] Int. Cl.⁴ ............................................. C04B 35/10
[52] U.S. Cl. ..................................... 264/117; 264/56; 501/131
[58] Field of Search ................... 264/56, 117; 501/131

[56] References Cited

U.S. PATENT DOCUMENTS

| | | | |
|---|---|---|---|
| 3,491,492 | 1/1970 | Veltz | 264/56 |
| 4,068,718 | 1/1978 | Cooke | 166/280 |
| 4,427,068 | 1/1984 | Fitzgibbon | 264/117 |
| 4,440,866 | 4/1984 | Lunghofer | 264/56 |
| 4,555,493 | 11/1985 | Watson et al. | 264/117 |

FOREIGN PATENT DOCUMENTS

| | | |
|---|---|---|
| 521930 | 5/1982 | Australia . |
| 0087852 | 9/1983 | European Pat. Off. . |
| 2037727 | 7/1980 | United Kingdom ................ 264/117 |

Primary Examiner—James Derrington
Attorney, Agent, or Firm—Larson and Taylor

[57] ABSTRACT

A superior proppant having very high permeability at formation pressures up to 20,000 psi, very high compressive strength, low specific gravity, and good acid resistance, is produced by a process comprising: (a) separating a fine fraction from a naturally occurring bauxite containing same; (b) pelletizing the separated fine fraction in the presence of water; (c) treating the pellets produced in step (b) to remove water therefrom; and (d) sintering the product of step (c) to produce a low density material suitable for use as a proppant.

10 Claims, 1 Drawing Figure

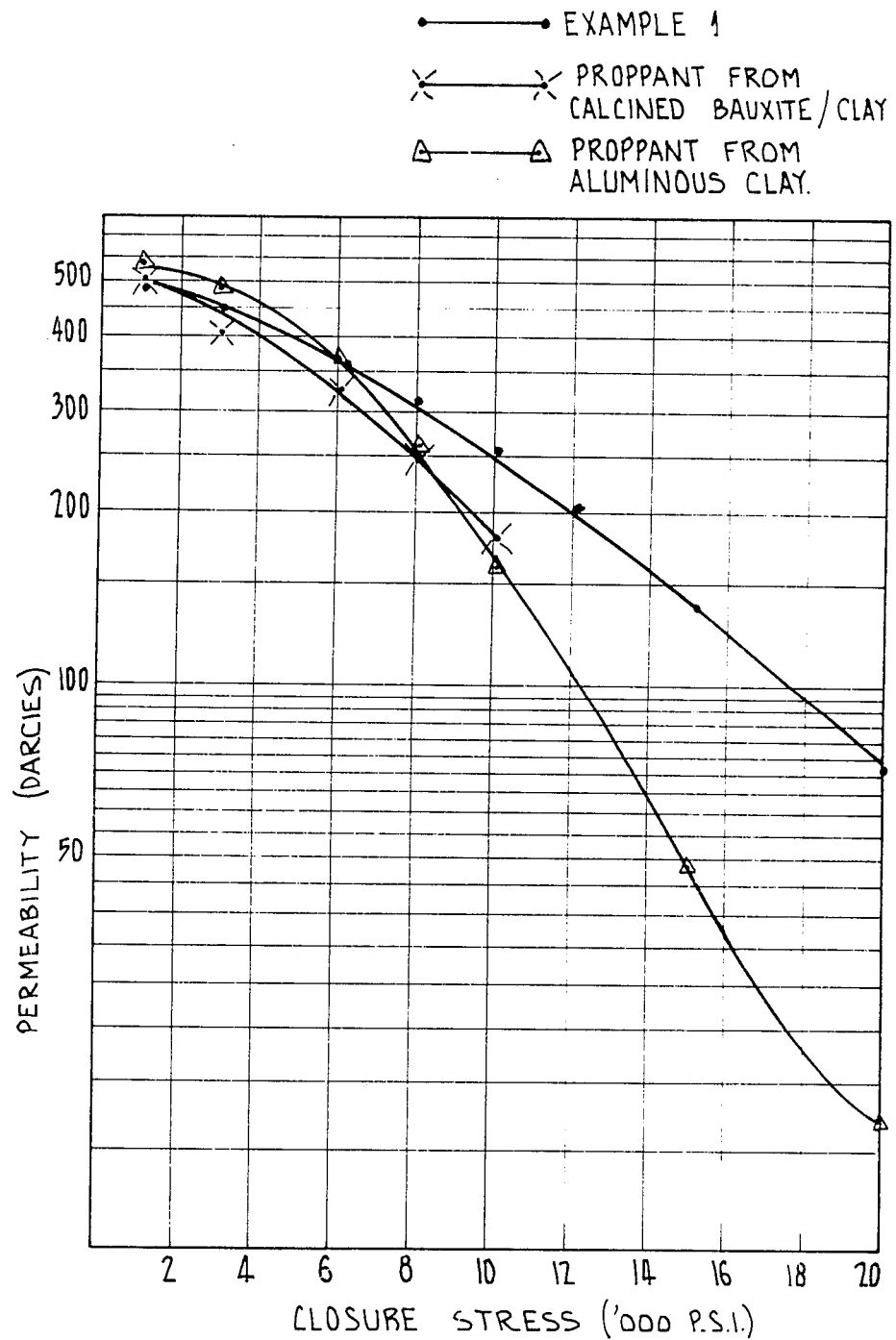

BAUXITE PROPPANT

This invention relates to a new and improved propping agent (proppant) derived from bauxite.

Bauxite - based proppants are known but are subject to considerable drawbacks as will be discussed in the survey of the prior art below.

In one aspect the present invention is distinguished from the prior art by use as a raw material of a fine fraction separated from naturally occurring bauxite containing same. This fine fraction when treated in the manner described in more detail below, unexpectedly provides a proppant having superior properties as well as significant economic advantages compared to the proppants of the prior art.

SURVEY OF THE PRIOR ART

The use of propping agents in the hydraulic fracturing of subterranean formations to improve the recovery of oil and gas is a procedure which has been used for nearly forty years. The technique is well described in the literature and the application of the technique is common practice.

The original particulate material used for this purpose was silica sand chosen for its particle shape and freedom from internal weaknesses. This material continues to be preferred product for shallow wells because of its cheapness and ease of availability. In recent years it has been necessary to seek alternative proppants because of the increasing depth at which oil and gas is being produced and the aggressive environments encountered. This has led to the use of materials such as glass beads and resin coated sands. One of the more effective proppants which has been developed has been sintered bauxite, the use of which is described in U.S. Pat. No. 4,068,718. This patent describes procedures for manufacture of propping agents and typical cases are quoted where the raw material is a calcined bauxite ore. This ore after grinding to a very fine powder typically less than twelve micrometers in size is formed into spherical particles or green pellets by compaction or rolling prior to being sintered. The objective of sintering is to cause the individual particles comprising the green pellets to bond together at temperatures below the melting point of the minerals present. In the above mentioned patent it is stated that the end product should have a specific gravity greater than about 3.4 with a preferred range from 3.5 to 3.8. The comment is made "Sintered bauxite, having a specific gravity below 3.4 is difficult to produce and because of the high void concentration would likely result in a product having low compressive strength." It is further stated that high density, fine grain particles have higher compressive strength than sintered large grain particles. Evidence is also presented to show a very broad correlation between the specific gravity of the final product and permeability at an applied stress of 10,000 psi. High permeability and compressive strength are essential for proppant to be used at depths greater than those for which sand is satisfactory.

Australian patent No. 521930 granted to the Norton Company again stresses the need to produce sintered bauxite proppant from finely ground pre-calcined material. In this case the use of coarser particles up to 50 micrometers in diameter as a minor component of the mixture was claimed as being satisfactory. This patent also refers to the benefits of using a temporary binder to retain stability of the green pellets prior to firing. It specifically refers to a density of at least 3.6 as the desirable level to achieve satisfactory crush resistance of the proppant.

It has been recognised that the high density of proppants made of sintered bauxite creates a problem in the placement of the material. This arises from the fact that the fluid used to transport the proppant requires modification from that used to transport for example, silica sand because of the substantially greater tendency for particles of sintered bauxite to settle more rapidly from the suspension. This increases the cost of placing the proppant but an even greater cost penalty results from the higher density by comparison with that of silica sand. It will be immediately obvious that a proppant with density of 3.7, which is typical of sintered bauxite presently used, will require a greater mass of material to fill a fracture of given volume than proppant with density of 2.65. In fact the change of density quoted requires 40% more by weight of the higher density proppant to fill the same volume than the lower density proppant would require. Proppants are purchased on a weight basis and a sintered bauxite proppant may have a price 20 times that of silica sand or more. When the density factor is taken into account the cost of changing from a silica sand proppant to sintered bauxite proppant may result in a more than 30 fold increase in cost of this component. Many attempts have therefore been made to produce proppants of high strength relative to sand but with a lower density than that of sintered bauxite. In this context European patent application No. 0 087 852 by Dresser Industries, Inc is relevant. This is based on the use of Eufala aluminous ore which after calcination contains 40-60% $Al_2O_3$ and 36.5-51% $SiO_2$. A density of less than 3 is claimed for this product with a minimum permeability at 10,000 psi of 100,000 Millidarcies at ambient temperature.

Data presented in this patent indicates that permeability begins to decrease sharply beyond a closure stress of 700 $kg/cm_2$ (10,000 psi).

U.S. Pat. No. 4,427,068 issued to Kennecott Corporation teaches a process of manufacturing sintered spherical composite pellets or particles comprising one or more clays as the major component together with bauxite, alumina or mixtures thereof. The product is claimed to have an apparent specific gravity of less than 3.40 and the mixture should contain at least 40% on a dry weight basis of clay. The five clays which may be used for the manufacture of the material are specifically described. Calcination of the clays prior to formation of the pellets is a prerequisite.

Australian patent application No. 16568/83 by the Norton Company is entitled "Low Density Proppant For Oil and Gas Wells". This document discusses a method of producing a low density sintered ceramic proppant containing chemically combined aluminium and silicon. The aluminium oxide content claimed is in the range 60-85% with densities of less than 3.4 grams per cubic centimeter, although such claim cannot be substantiated from the evidence quoted in examples. The raw materials used for this are calcined bauxite and clay together with a binder to give an acceptable green strength of the pellet.

With the exception of the Dresser application all documents refer to a preferred particle size of the feed material and typically specify average particle sizes of less than 10-15 micrometers with the exception of Australian patent No. 521930 which permits the limited use of material up to 50 micrometers. U.S. Pat. No.

4,068,718 refers to a preferred average particle size of 4–5 micrometers or less than 7 micrometers.

Fitzgibbon in U.S. Pat. No. 4,427,068 specifies that a small particle size is required to obtain the desired density and states that the average particle size should be less than about 15 micrometers, and, preferably less than about 10 micrometers and, most preferably, less than about 5 micrometers. Elsewhere he states that an average particle size smaller than 5 micrometers is desirable and the average particle size is most preferably below 3 micrometers and usually above 0.5 micrometers. He states further that the dry homogeneous particulate mixture has an average particle size of less than about 15 micrometers before pelletising. It will be immediately obvious to those skilled in the art that grinding calcined bauxites or clays to such fine particle size is expensive in terms of equipment, grinding media and power usage, particularly when average particle sizes below 3 micrometers are specified. Large scale grinding of this type is likely to make the entire process uneconomic and this fact explains the use of only 4 to 8 micrometer material in the example quoted by Fitzgibbon.

Studies of proppants which are essentially based upon alumina and silica in various proportions demonstrate that the major minerals present are corundum (alpha-phase $Al_2O_3$ and mullite $3Al_2O_3 \cdot 2SiO_2$). The phase diagrams representing the formation of these minerals are well known and their presence has been widely confirmed by mineragraphic and X-ray diffraction studies of typical sintered clay/bauxite products.

Similar mineralogy is observed in products such as high temperature calcined bauxite used for refractory purposes and calcined bauxites of the type used as the initial feed stock for production of sintered bauxite. Depending upon the nature of impurities present other minerals such as spinels or hematite may also occur. Studies of polished sections of a typical sintered bauxite of the type referred to in U.S. Pat. No. 4,068,718 using a high power optical microscope shows the presence of irregular cystals of corundum with interstitial mullite. The proportion of corundum to mullite is a function of the proportions of $Al_2O_3$ and $SiO_2$ in the original feed material. It is probable that the sintered bauxite owes its strength to the interlocking mass of corundum crystals while the interstitial mullite allows elastic deformation to take place under load.

In summarising the foregoing, it may be said that prior art has taught us that the most desirable properties for propping agents in the hydraulic fracturing of subterranean formations at considerable depth are:
high permeability at high formation pressures
high compressive strength
high acid resistance
low specific gravity Until now, proppants made from feed material containing bauxite have possessed all of these properties, except for low specific gravity. In order to achieve the requisite low specific gravity, low density additives such as clays, must be added to the bauxite. This is disadvantageous since the clays are normally first calcined, an energy intensive step. Likewise, the bauxite feed material also must be pre-calcined, adding to the costs of production. Further, binders may have to be added at the pelletising stage to give acceptable green strength to the pellets. It may also be noted here that excessive addition of siliceous material, such as clay, can lead to a decrease in acid resistance of the proppant.

We are also taught by the prior art that the strength of the proppant pellets is strongly related to the size of the constituent grains. Grain size of the feed material of less than about 5 micrometers, even as low as 3 micrometers, is considered preferable. Large scale grinding to achieve these grain sizes is expensive.

To date, workers in the art have been unable to reconcile the two most desirable properties of proppants, namely very high strength and low specific gravity.

THE PRESENT INVENTION

The present invention relates to a substantially improved proppant made from bauxite material. It is superior to other proppants known to be made from bauxite, particularly in respect to:
very high permeability at formation pressures up to 20,000 psi.
very high compressive strength
low specific gravity
good acid resistance These desirable features arise primarily from the choice of the feed material, namely a fine fraction of a naturally occurring bauxite. The fine fraction as separated from the natural bauxite has a grain size typically from about 0.02 to 0.3 micrometers with an associated specific surface area of about 30 square meters per gram. This is considerably finer than bauxite material previously used in proppant manufacture, and lends the following advantages to the manufacturing process.
the need for expensive pregrinding is eliminated
the need for expensive pre-calcination is eliminated
high strength of the green pellets is obtained without the addition of binder
the very high surface area of the feed material makes it highly reactive. This leads to a reduction in sintering time, and hence reduced energy consumption
an exceptionally high degree of uniformity in the composition of the pellets The advantages in manufacturing and superior properties of the finished proppant are discussed in detail below.

1. The very fine particle size allows an exceptionally high degree of uniformity of blend in the manufacture of the pellet.
2. The said pellet comprising a multitude of very fine particles has numerous points of contact between the ultrafine particles and it is at these points of contact that sintering will be initiated, resulting in the rapid production of a very strong proppant. Kingery (1976) estimates that sintering rate is roughly proportional to the inverse of the particle size which suggests that particles with an average size of 0.2 micrometers or less such as are used in the work described herein will sinter, at a rate at least 20 times faster than 4 micrometer particles provided the minimum temperature required to initiate sintering is achieved.
3. It has been found that the extremely intimate dispersion of minerals and thus of constituent elements is conducive to a high degree of reactivity with each pellet as it is heated, leading to the production of a wide range of temperature dependent crystal sizes and structures. The proppant particles retain very high strength throughout these internal changes, considerably in excess of that normally associated with other proppants of similar chemical composition. This behaviour is discussed in greater detail below.
4. The density of the fired particle is a function of the mineralogy and the volume of closed voids within the particle. The presence of voids has generally been regarded as undesirable in that they lead to a reduction in strength.

It is this factor which has led previous investigators to lay stress upon the need to achieve densities of the sintered bauxite particle in excess of 3.4 and preferably between 3.5 and 3.8. It has now unexpectedly been found that the ultrafine nature of the feed material used to make the high strength proppant which is the subject of discovery in this patent causes the closed pores to be so distributed after firing that a density of less that 3.4 can be achieved while maintaining strengths adequate to permit high levels of permeability at formation pressures up to 20,000 psi.

5. Yet another benefit associated with using such finely divided materials obtained from natural bauxite relates to the avoidance of any need for a binder to maintain a high degree of strength in the green pellet. The inter-particulate forces (Van der Waal's forces) within a packed pellet made from such ultrafine material are believed to be very high and the pellets are able to resist rupture by the forces which develop during drying and calcination, so they can be handled without special precautions.

6. A final and very obvious benefit arising from the ability to use natural uncalcined bauxite of the particle size considered is cost. Pre-calcination of bauxite or other aluminous material is expensive and energy intensive. The same is also true of any intensive grinding procedure.

The drawing is a graphical presentation of permeability as a function of closure stress for a proppant in accordance with the present invention and for two conventional intermediate proppants.

DISCLOSURE OF PREFERRED EMBODIMENTS OF THE INVENTION

Finely divided materials suitable for the production of proppants according to the invention are readily obtained from bauxite deposits such as for example those of the type occurring at Weipa in Northern Queensland. In these and similar bauxites a fine fraction exists which can be easily separated, for example by slurrying the bauxite in water in the presence of a dispersant. A variety of dispersants may be used such as those based upon phosphate compounds but in the Weipa case adjustment of the pH to a value of approximately 11 by the use of caustic soda is adequate to provide the required dispersion.

A simple classification step results in recovery of the fine fraction as a dilute slurry. The contained solids are separated by settling or filtration and it will be recognised by those experienced in the art that flocculants may be used, if appropriate, to assist in carrying out this dewatering operation more rapidly.

To facilitate the preparation of the feed for pelletising, drying may be necessary and a variety of equipment can be used for this purpose. The preferred equipment is a spray dryer or a nozzle dryer, since the dried material will then be in a divided state suitable for pelletising in an intensive mixer such as that manufactured by the Eirich Company of West Germany, but the use of other dryers or filters is acceptable, particularly if they decrease the energy required to evaporate water.

The use of the Eirich mixer allows the fine powder to be pelletised in the presence of appropriate amounts of water, typically in the range from 14-18% by weight. Proper operational control of the mixer equipment allows the production of uniformly spherical particles with a particle size ranging typically from 0.15 millimeters to 4.0 millimeters. It is possible to exercise control over particle size distribution by controlling the conditions of operation of the mixer. Furthermore if any particular particle size is in excess of that required for later processing such material can be readily recycled in the process after size reduction or dispersion if necessary.

It has been found that the particular fraction proposed in this document as a source of proppant has in the Weipa deposits an alumina content of about 60% with a typical range from 57-63%. Similarly the silica content will average about 9% with a range of typically 7-11%. Substantially all of this silica will be present as the mineral kaolinite, although small amounts of quartz may be present. Typically the mineralogy will comprise 30-50% gibbsite with 22-45% boehmite, 16-24% kaolinite and less than 1% quartz. Oxides of iron and titanium will total about 9-12%.

Electron microscope studies have confirmed that the mineral particles are typically from about 0.02 to 0.3 micrometers in diameter and free minerals such as boehmite, kaolinite and hematite are commonly present. In other words, the particles are frequently mono-minerallic in nature and because of the very large total surface area rapid reaction between particles is facilitated at elevated temperatures producing primarily corundum and mullite.

In the course of heating such a product to the typical temperature range of 1350°-1500° C. required to produce strength beyond that generally associated with intermediate grade proppants a series of changes occurs in these pellets. Before firing is actually commenced, drying to remove free water is desirable to provide stability of the pellets when they are introduced to the kiln. The alumina minerals which are present, namely, gibbsite, boehmite and kaolinite progressively lose their combined water as the temperature is increased to about 600° C.

The crystal lattices become disordered and as the temperature is further increased the aluminium oxides undergo a series of phase changes. It is to be expected that the sequence of phase changes may include as transition states gamma, delta, theta, chi and kappa forms of alumina. At a temperature of approximately 950° C. the formation of mullite commences and at about 1050° C. the alumina begins to convert to the alpha-phase mineral which is known as corundum. The minerals corundum and mullite are the final major phases in the end product and as the temperature is increased the particles gain in compressive strength due to the development of an extremely fine intergrowth or network of these minerals.

During calcination, the pellets may shrink in diameter by more than 20%.

The high reactivity of the uncalcined bauxite and its very fine particle size facilitates the formation of the required phases.

The initial crystallite size of the proppant subjected to temperatures below 1400° C. is so fine that it is difficult to resolve by an optical microscope. The exception to this is the presence of occasional grains of spinel. As the temperature is increased, significant grain growth does occur and it becomes possible to resolve the individual minerals optically. Confirmation of the mineralogy as corundum and mullite with subsidiary iron titanate has been obtained by X-ray diffraction. From the XRD data of a sample fired at 1400° C. in a laboratory muffle it has been estimated that the average crystallite size of corundum is about 880 Angstroms and of mullite 740 Angstroms (0,088 and 0,074 micrometers respectively).

As the temperature of calcination is increased, very rapid growth of crystallite size can be detected, and this is thought to be associated with the extreme intimacy of the constituent minerals. At the high temperatures studied (1450°-1500° C.) relatively coarse crystals particularly of spinel like minerals of 20 micrometer length and even up to 100 micrometers can be seen. The proppant patent literature teaches that proppant particles containing such coarse crystals or grains should be of low strength. The high strength continuing to be observed is related to the development of a "basket - weave" structure of randomly matted crystal.

This is analogous to a reinforcing fibre system conferring the desirable properties of toughness and resistance to fracturing. Once again, this property appears to be dependent upon the extremely fine nature of the feed which in turn generates initially very fine intimately dispersed grains of mullite and corundum and these latter fine minerals can easily develop into larger grains while retaining the required strength.

Hence, the feedstock used is capable of producing the unexpected property of yielding a proppant with continued high strength despite the variation in crystal size texture and fabric resulting from exposure to different temperatures.

Furthermore, the internal structures are such that strength is enhanced beyond that which would be expected from a proppant of similar chemical composition made by previously described procedures. At the same time, the density of the pellets, which in all the samples tested was less than 3.40 and averaged 3.35 g/cm$^3$, is substantially below that of the sintered bauxite proppants.

The excellent values apparent for strength and toughness are accompanied by good resistance to corrosion in acid or alkaline environments.

It will be apparent from the foregoing disclosure that in a principal aspect the invention provides a process for manufacture of a material suitable for use as a proppant, characterised by the following steps:
(a) separating a fine fraction from a naturally occurring bauxite containing same;
(b) pelletizing the separated fine fraction in the presence of water;
(c) treating the pellets produced in step (b) to remove water therefrom;
(d) sintering the product of step (c) to produce a low density material suitable for use as a proppant.

The final product is preferably in the form of spherical particles in the size range 2 mm to 0.3 mm suitable for use as proppant in hydraulic fracturing of formations exhibiting pressures of up to 20,000 psi, in which the particles are predominantly composed of microcrystallites of corundum and mullite.

The raw material is preferably uncalcined natural bauxite fraction composed largely of monominerallic particles of gibbsite, boehmite and kaolinite, the kaolinite representing no more than 25% of the total, said particles having a typical size range from 0.02 to 0.3 micrometers and an associated specific surface area of typically 30 square meters per gram.

The invention includes a process for the manufacture of green pellets from the material described in the preceding paragraph without the requirement to use any binder or other additive, said pellets having sufficient strength in both wet and dry states to retain their integrity during handling and thermal processing operations. The density of the calcined proppant particles is less than 3.4 after calcination in the range 1380° to 1500° C.

In the preferred final product, the permeability of a 20/40 mesh (850/425 micrometer) fraction at 10,000 psi exceeds 50% of the value attained at 2000 psi and further retains a permeability at 15,000 psi of about 30% of the value at 2000 psi.

The invention will be further illustrated by the following non-limiting example.

EXAMPLE 1

A bauxite slurry sample produced from the Weipa bauxite deposit was dispersed using caustic soda to achieve a pH level of about 11. The coarse fraction was allowed to settle and the supernate collected by decantation. The silica content of 10.5% was equivalent to a kaolinite content of 23%. The decanted fraction was examined by transmitted electron microscopy and found to comprise particles generally from 0.02 to 0.3 micrometers in size. After flocculation and decantation of clear water a parcel of the thickened slurry of fine particles containing in excess of three tonnes of solid was dried in a spray dryer.

The dried solids were blended with another portion of the thickened slurry and pelletised in an Eirich mixer-pelletiser at about 17% free moisture level. No binder was used. A highly spherical product resulted with a typical particle size range from about 0.5 to 4 millimeters, although it was demonstrated that this sizing distribution could be modified. The spherical product was then dried to about 2% free moisture in a rotary dryer prior to being fed to a continuous rotary kiln.

The pellets were calcined to a maximum temperature of 1500° C. The resulting fired pellets retained their highly spherical shape and did not bond to one another during firing. A high kiln throughput was achieved and the high quality of all samples taken, even at temperatures below 1400° C. confirmed the high sintering rate of the material.

Several samples were taken of the product during calcination. The 0.85/0.425 mm fraction (20/40 mesh) of each was recovered and tested. The following table gives the arithmetic means and standard deviations of important properties.

|  | Mean | S.D. |
| --- | --- | --- |
| Particle density | 3.35 g/cm$^3$ | 0.035 |
| Bulk density | 1.91 g/cm$^3$ | 0.05 |
| American Petroleum Institute Acid solubility test | 2.3% | 0.14 |
| American Petroleum Institute Crust test (10,000 psi) | 5.5% | 0.9 |
| Permeability (Darcies) |  |  |
| 1000 psi | 483 | 18 |
| 3000 psi | 432 | 13 |
| 6000 psi | 360 | 19 |
| 8000 psi | 303 | 17 |
| 10000 psi | 247 | 22 |
| 12000 psi | 200 | 24 |
| 15000 psi | 133 | 19 |
| 20000 psi | 70 | 12 |

The properties shown in the above tabulation conform to American Petroleum Institute specifications where these are available.

The permeability measurements were made using distilled water at ambient temperature. A graphical representation of the permeability behaviour with increasing closure stress is shown in the drawing. The results of two intermediate proppants, one based on a mixture of calcined bauxite and clay and the other on an aluminous clay are included to demonstrate the comparative behaviour.

Relatively high levels of permeability were retained throughout the conductivity testing. For example it is common practice to compare permeabilities at elevated pressures with that achieved at 2000 psi. Fitzgibbon in U.S. Pat. No. 4,427,068 claims a decrease in permeability from 2000 psi to 10,000 psi of not more than three-fourths (75%). In European patent application No. 0 087 852 the decrease is about 65%.

By comparison material of the present invention after loading to 10,000 psi loses only 46% of the conductivity achieved at 2000 psi and even at 15,000 psi still retains about 30% of its conductivity.

It will be clearly understood that the invention in its general aspects is not limited to the specific details referred to hereinabove.

I claim:

1. A process for manufacture of a sintered bauxite suitable for use as a proppant comprising the following steps:
   (a) separating a fine fraction from a naturally occurring bauxite containing same, said fine fraction being an uncalcined natural bauxite fraction composed largely of monominerallic particles of gibbsite, boehmite and kaolinite, the kaolinite responding no more than 25% of the total, said particles having a size range from 0.02 to 0.3 micrometers;
   (b) pelletizing the separated fine fraction in the presence of water;
   (c) treating the pellets produced in step (b) to remove water therefrom;
   (d) sintering the product of step (c) to produce sintered bauxite suitable for use as a proppant, said sintered bauxite having a density of less than 3.4.

2. A process according to claim 1 in which the fine fraction separated in step (a) has an associated specific surface area of about 30 square meters per gram.

3. A process according to claim 1 wherein said sintered bauxite is composed primarily of corundum and mullite.

4. A process according to claim 1 wherein said uncalcined natural bauxite fraction contains 30-50% gibbsite, 22-45% boehmite, and 16-24% kaolinite.

5. A process according to claim 1 wherein said uncalcined natural bauxite fraction contains 57-63% alumina.

6. A process according to claim 5 wherein said uncalcined natural bauxite fraction contains 7-11% silica.

7. A process according to claim 1 wherein said proppant is in the form of substantially spherical particles in the size range 2 mm to 0.3 mm.

8. A process according to claim 1 wherein said pelletizing step is carried out without binder to produce green pellets, said green pellets having sufficient strength to retain their integrity during steps (c) and (d).

9. A process according to claim 1 wherein step (c) is effected by heating said pellets and wherein step (d) is effected by further heating the heated pellets at a temperature in the range of 1350° to 1500° C.

10. A process according to claim 1 wherein said sintered bauxite has a strength which renders the product suitable for use as a proppant in the hydraulic fracturing of formations exhibiting pressures of up to 20,000 psi.

* * * * *